US010250526B2

(12) United States Patent
Liang et al.

(10) Patent No.: US 10,250,526 B2
(45) Date of Patent: Apr. 2, 2019

(54) METHOD AND APPARATUS FOR INCREASING SUBRESOURCE LOADING SPEED

(71) Applicant: GUANGZHOU UCWEB COMPUTER TECHNOLOGY CO., LTD., Guangzhou (CN)

(72) Inventors: Jie Liang, Guangdong (CN); Huabin Chen, Guangdong (CN)

(73) Assignee: GUANGZHOU UCWEB COMPUTER TECHNOLOGY CO., LTD., Guangzhou (CN)

( * ) Notice: Subject to any disclaimer, the term of this patent is extended or adjusted under 35 U.S.C. 154(b) by 391 days.

(21) Appl. No.: 15/012,095

(22) Filed: Feb. 1, 2016

(65) Prior Publication Data

US 2016/0149832 A1 May 26, 2016

Related U.S. Application Data

(63) Continuation of application No. PCT/CN2014/077409, filed on May 14, 2014.

(30) Foreign Application Priority Data

Jul. 31, 2013 (CN) .......................... 2013 1 0329393

(51) Int. Cl.
*H04L 29/12* (2006.01)
*H04L 12/911* (2013.01)
(Continued)

(52) U.S. Cl.
CPC ...... *H04L 47/821* (2013.01); *G06F 17/30887* (2013.01); *G06F 17/30902* (2013.01);
(Continued)

(58) Field of Classification Search
CPC .......................... H04L 61/10; H04L 61/1511
See application file for complete search history.

(56) References Cited

U.S. PATENT DOCUMENTS 8,200,842 B1\* 6/2012 Lau ..................... H04L 43/0817
709/245
8,800,040 B1\* 8/2014 Tan ..................... H04L 63/1408
726/24

(Continued)

FOREIGN PATENT DOCUMENTS

CN 102023801 A 4/2011
CN 102855334 A 1/2013
(Continued)

OTHER PUBLICATIONS

Office Action for Chinese Application No. 201310329393.6 dated Dec. 3, 2015.
(Continued)

*Primary Examiner* — Jeong S Park
(74) *Attorney, Agent, or Firm* — Alston & Bird LLP

(57) ABSTRACT

Provided are methods and apparatus for increasing subresource loading speed. A method may include receiving a page request initiated by a user, extracting the host domain name corresponding to the page URL, and querying if the hash table has a domain name tree corresponding to the host domain name; if the hash table has a domain name tree corresponding to the host domain name, traversing the domain name tree to extract a plurality of subresource domain names with the highest priority, and at the same time, establishing TCP connections for the host domain name and the plurality of subresource domain names; when the main document data of the host domain name is received, initiating a subresource loading request according to the subresource URL in the main document data; if the subresource domain name in the subresource loading request is a domain name in the above plurality of subresource domain names, directly initiating a HTTP request by using the previously established TCP connection, and completing the loading of the subresource. By establishing TCP con-
(Continued)

nections for subresource domain names with high priority in advance, such methods and apparatus solve the problem that TCP connection needs to be established on site when a subresource loading is requested.

20 Claims, 5 Drawing Sheets

(51) Int. Cl.
  *G06F 17/30* (2006.01)
  *H04L 29/08* (2006.01)
  *H04L 29/06* (2006.01)
(52) U.S. Cl.
  CPC .......... *H04L 61/1511* (2013.01); *H04L 67/02* (2013.01); *H04L 69/16* (2013.01); *H04L 61/10* (2013.01)

(56) References Cited

U.S. PATENT DOCUMENTS

| | | | |
|---|---|---|---|
| 9,531,736 B1* | 12/2016 | Torres | ................ H04L 63/1408 |
| 2002/0147788 A1 | 10/2002 | Nguyen | |
| 2007/0002778 A1* | 1/2007 | Shi | .................... H04L 29/12018 370/260 |
| 2011/0040777 A1 | 2/2011 | Stefanov | |
| 2011/0063310 A1 | 3/2011 | Iwade et al. | |
| 2014/0280305 A1* | 9/2014 | James | ................ H04L 61/1511 707/769 |
| 2015/0195243 A1* | 7/2015 | Roskind | .............. H04L 61/1511 709/213 |

FOREIGN PATENT DOCUMENTS

| CN | 103152426 A | 6/2013 |
|---|---|---|
| CN | 103365695 A | 10/2013 |

OTHER PUBLICATIONS

Office Action for Chinese Application No. 201310329393.6 dated Jul. 15, 2016.
Office Action for Chinese Application No. 201310329393.6 dated Nov. 9, 2016.
International Search Report and Written Opinion for Application No. PCT/CN2014/077409 dated Aug. 26, 2014.

* cited by examiner

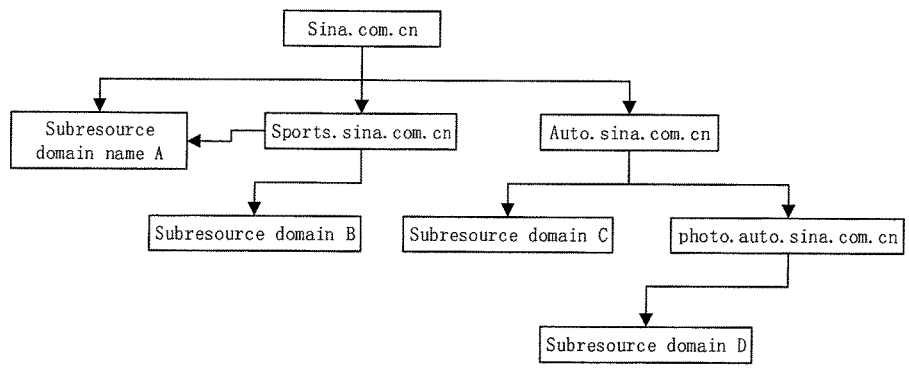
FIG. 1
| Host domain name | Domain name tree |
|---|---|
| Sina.com.cn | DomainTree |
| QQ.com | DomainTree |
| ... | ... |
| sohu.com | DomainTree |
FIG. 2
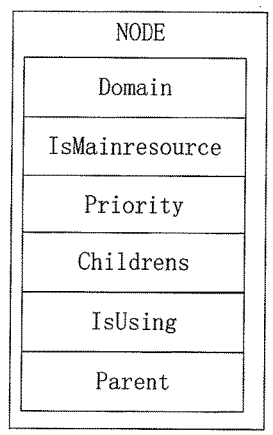
FIG. 3

METHOD AND APPARATUS FOR INCREASING SUBRESOURCE LOADING SPEED

This application is a continuation of and claims priority to International Application No. PCT/CN2014/077409 filed May 14, 2014, which claims priority to Chinese Patent Application No. 201310329393.6 filed Jul. 31, 2013, with the State Intellectual Property Office of the People Republic of China, entitled "Method and apparatus for increasing subresource loading speed," the entire contents each of which are incorporated herein by reference.

TECHNICAL FIELD

The present invention relates to the field of mobile communication technologies, and in particular to a method and an apparatus for increasing subresource loading speed.

BACKGROUND

With the wide application of smart operating systems on mobile terminals, browsing Internet using a mobile terminal has become a habit. Mobile Internet applications are gradually taking place of conventional Internet applications. However, most mobile Internet applications are implemented by making slight changes to conventional Internet applications, many of which still retain the work mode of conventional Internet applications and are unable to fully adapt to mobile terminals.

Typically, when an existing browser needs to load a subresource in the web page, a resource loading request is generated only after the browser kernel parses the subresource's URL (Uniform Resource Locator) and the main resource is downloaded. Since a server on which subresources are stored has a different domain name than that of the server on which main resources are stored, a subresource loading request typically needs to establish a connection with a new server. Such a process is divided into two phases: DNS (Domain Name System) query and establishing TCP (Transmission Control Protocol) connection. Since DNS query and establishing TCP connection rely on a network's ability, the time required to implement the connection is uncertain. For static network terminals, the process typically takes around 200 ms. Due to stable equipment performance and network conditions, there is no significant impact on a user's experience. However, as the performance and conditions of a mobile network may not be as stable as the static network terminals, the process may take several hundred milliseconds to several seconds, or even more than 10 seconds, which significantly affects the subresource loading speed. As a result, mobile users have extremely low access speed under some circumstances, resulting in poor user experience.

BRIEF SUMMARY

The technical problem to be solved by the present invention is how to accelerate the subresource loading speed and improve the mobile user access efficiency.

According to one exemplary embodiment, a method is provided for increasing subresource loading speed. The method comprises: receiving a page request initiated by a user; extracting the host domain name corresponding to the page URL; querying if the hash table has a domain name tree corresponding to the host domain name; if the hash table has a domain name tree corresponding to the host domain name, traversing the domain name tree corresponding to the host domain name and extracting a plurality of subresource domain names with the highest priority, and at the same time, establishing TCP connections for the host domain name and the plurality of subresource domain names; when the main document data of the host domain name is received, resolving the main document data and initiating a subresource loading request according to the subresource URL in the main document data; and if the subresource domain name in the current subresource loading request is a domain name in the above plurality of subresource domain names, directly initiating a HTTP request by using the previously established TCP connection of the subresource domain name, and completing the loading of the subresource.

According to another exemplary embodiment, a method is provided for increasing subresource loading speed. The method comprises: extracting the host domain name in a page request; querying if a domain name tree corresponding to the host domain name exists; if a domain name tree corresponding to the host domain name exists, extracting a predetermined amount of subresource domain names from the domain name tree, and establishing TCP connections for the host domain name and the predetermined amount of subresource domain names; initiating a subresource loading request according to the subresource domain name in the obtained main document data corresponding to the host domain name; and if a subresource domain name with TCP connection established contains the subresource domain name in the current subresource loading request, initiating a HTTP request by using the established TCP connection corresponding to the subresource domain name, and loading the subresource.

According to yet another exemplary embodiment, an apparatus is provided for increasing the subresource loading speed. The apparatus comprises: a processor; a memory; a query module stored in the memory and executed by the processor, configured to extract the host domain name in the page request, and query if a domain name tree corresponding to the host domain name exists; a connection establishing module stored in the memory and executed by the processor, configured to, if a domain name tree corresponding to the host domain name exists, extract a predetermined amount of subresource domain names from the domain name tree, and establish TCP connections for the host domain name and the predetermined amount of subresource domain names; a loading request module stored in the memory and executed by the processor, configured to initiate a subresource loading request according to the subresource domain name in the obtained main document data corresponding to the host domain name; and a loading module stored in the memory and executed by the processor, configured to, if a subresource domain name with TCP connection established contains the subresource domain name in the current subresource loading request, initiate a HTTP request by using the established TCP connection corresponding to the subresource domain name, and loading the subresource.

According to a yet further exemplary embodiment, a computer readable medium is provided having program codes executable by the processor. The program codes cause the processor to execute the following: extracting the host domain name in the page request, querying if a domain name tree corresponding to the host domain name exists; if a domain name tree corresponding to the host domain name exists, extracting a predetermined amount of subresource domain names from the domain name tree, and establishing TCP connections for the host domain name and the predetermined amount of subresource domain names; initiating a subresource loading request according to the subresource domain name in the obtained main document data corresponding to the host domain name; and if a subresource domain name with TCP connection established contains the subresource domain name in the current subresource loading request, initiating a HTTP request by using the established TCP connection corresponding to the subresource domain name, and loading the subresource.

These and other embodiments of the present invention are described further and shown herein.

BRIEF DESCRIPTION OF THE DRAWINGS

FIG. 1 illustrates a hierarchical structure of a domain name tree in accordance with an embodiment of the present invention;

FIG. 2 illustrates a data structure of a hash table in accordance with an embodiment of the present invention;

FIG. 3 illustrates a data structure of a node of a domain name tree in accordance with an embodiment of the present invention;

DETAILED DESCRIPTION

Figure 4:
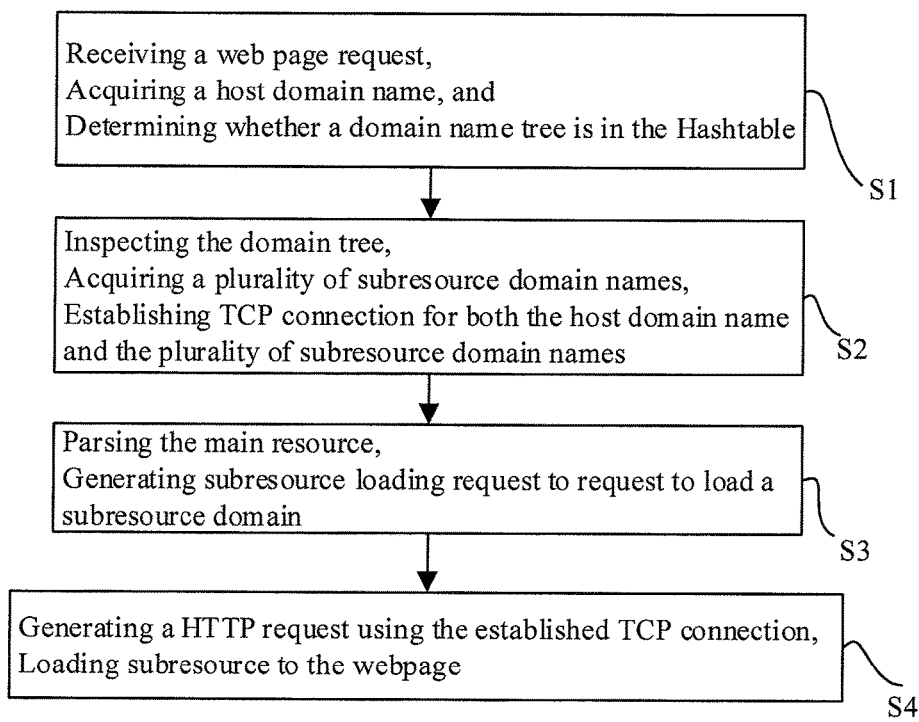
FIG. 4 is a method for increasing the subresource loading speed in accordance with an embodiment of the present invention.

The present disclosure now will be described more fully with reference to the accompanying drawings, in which some, but not all embodiments of the disclosure are shown. This disclosure may be embodied in many different forms and should not be construed as limited to the embodiments set forth; rather, these example embodiments are provided so that this disclosure will be thorough and complete, and will fully convey the scope of the disclosure to those skilled in the art. Like numbers refer to like elements throughout.

Embodiments of the present invention provide a method for increasing the subresource loading speed. The method comprises creating a hash table (or hash map), which comprises a host domain name and its domain name tree, and establishing TCP connections to servers for the host domain name and subresource domain names at the same time. When a subresource loading request is generated, the established TCP connections for the subresource domain names are available for use, which increases the subresource loading speed.

One embodiment is described by using website of Sina (sina.com.cn) as an example. A typical domain name tree in accordance with an embodiment is shown in FIG. 1. A host domain name of the main web page sina.com.cn may have a plurality of subresource domain names, such as subresource domain name A, sports page (sports.sina.com.cn), and automobile page (auto.sina.com.cn). Comparing to the host domain name, this is the first-level subresource. Each subresource domain name may further have its subresource domain names. Compared to the host domain name, this is the second-level subresource. For instance, the first level sports page may have a second-level subresource domain name B, or may use the subresource domain name A as its second-level subresource domain name. In this manner, the tree structure may have multi-levels. For instance, the automobile page may have a second-level subresource domain name C and an automobile image page (photo.auto.sina.com.cn). The automobile image page at the second-level may further have a subresource domain name D at the third-level. A domain name tree shown in FIG. 1 illustrates domain names at different levels.

Specifically, in some embodiments, a hash table may be used to save the domain name tree. A domain name tree may be established by acquiring a host domain name and its respective subresource domain names at the client side of a browser according to the host and subresource domain names arrangement of an existing website. The client may save a hash table including the host domain name and the domain name tree.

The data structure of a hash table is shown in FIG. 2. In the table, the keyword of each item is associated with the host domain name (e.g. sina.com.cn, QQ.com, sohu.com, etc.) and the key information corresponding to each host domain name is a domain name tree. The domain name tree is saved in a linked list structure. Each node of the tree is associated with a subresource domain name. The data structure of a domain name tree node is illustrated in FIG. 3. In FIG. 3, each term is explained as below:

Domain: domain name of the node;
IsMainresource: whether to request main resource or subresource;
Priority: priority of the node, mainly used for subresource domain name. The priority of the main resource is set to the lowest priority. When a domain name contains a JS/CSS request, the priority may be significantly increased (e.g. Priority+5). For other regular requests, it is accumulated according to a base number (e.g. Priority+1);
Children: a pointer list saving a number of pointers each of which points to a child node;
IsUsing: indicating whether a domain name node is used;
Parent: a pointer pointing to the parent node.

In one embodiment of the present invention, the method for increasing the subresource loading speed may comprise the following steps.

The method comprises acquiring a host domain name in a web page request and determining whether a domain name tree corresponding to the host domain name is saved in local storage. If a domain name tree corresponding to the host domain name is saved in local storage, the method further comprises acquiring a number of subresource domain names from the domain name tree and establishing TCP connections for both the host domain name and the subresource domain names. Upon receipt of main resource associated with the host domain name, a subresource loading request is generated. Then, the method comprises determining whether the subresource domain name specified in the subresource loading request is corresponding to one subresource domain name listed in the subresource domain names for which TCP connection has been established. If a corresponding subresource domain name is identified from the subresource domain names, a HTTP request is generated using the established TCP connection. The subresource is then loaded to the web page.

The domain name tree in one embodiment may be saved in the form of a hash table. The domain name tree may also be saved in other forms according to various embodiments.

When the domain name tree is saved in the form of a hash table, determining whether a domain name tree corresponding to the host domain name is saved in local storage is implemented by querying the hash table.

In one embodiment, if the method determines that a domain name tree corresponding to the host domain name exists in the hash table, a number of subresource domain names according to the priority of subresource domain names is acquired. The number of subresource domain names can be predetermined.

FIG. 4 illustrates a method for increasing the subresource loading speed. Steps are described as follows.

At S1, the method comprises receiving a web page request from a user, acquiring a host domain name corresponding to the web page URL and determining whether a domain name tree corresponding to the host domain name is shown in the hash table.

At S2, if a domain name tree corresponding to the host domain name is determined to be in the hash table, the method comprises inspecting the domain name tree and acquiring a plurality of subresource domain names with the highest priority and establishing TCP connections for both the host domain name and the plurality of subresource domain names. If the domain name tree is not shown in the hash table, a domain name tree may be established for future use.

At S3, upon receipt of main resource associated with the host domain name, the main resource is parsed and subresource loading request is generated to request to load a subresource domain according to subresource's URL.

At S4, if the subresource domain name specified in the subresource loading request is corresponding to one subresource domain name listed in the plurality of subresource domain names, a HTTP (hypertext transport protocol) request is generated using the established TCP connection. The subresource is then loaded to the web page.

Using established TCP connection may increase the subresource loading process, improve the working efficiency of browser applications and the user experience.

Figure 5:
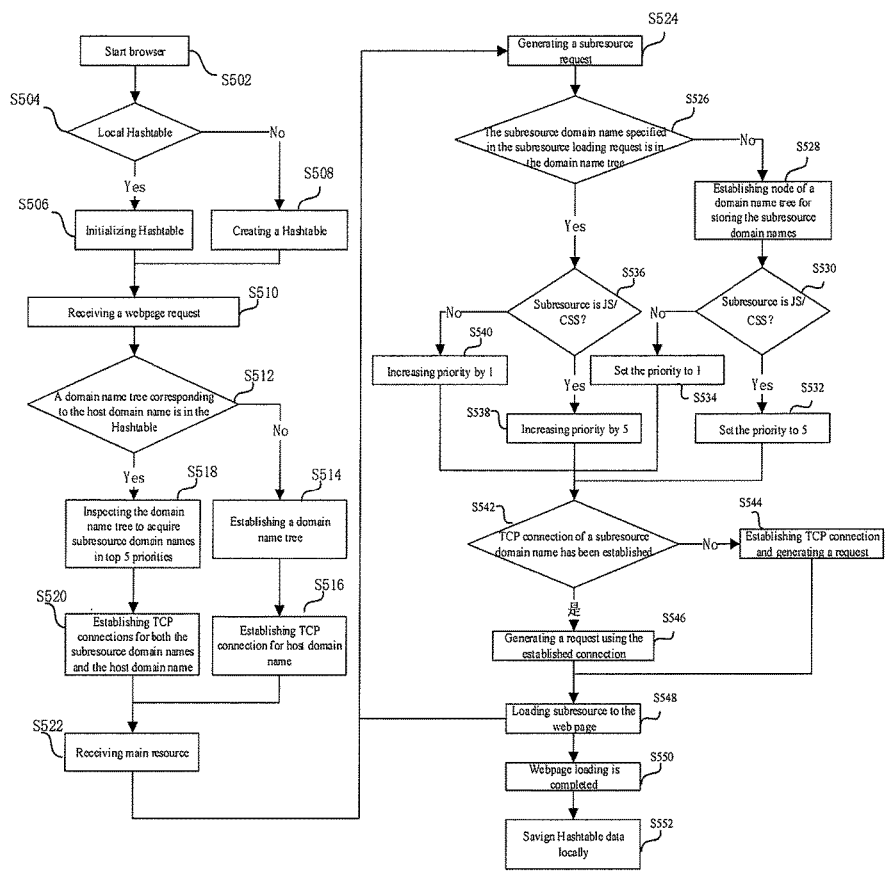
FIG. 5 is a method for increasing the subresource loading speed in accordance with an embodiment of the present invention.

Referring to FIG. 5, TCP connections are established for 5 subresource domain names at one time and the priority of the subresource domain names is set to 5. The method is explained in detail with reference to FIG. 5.

A browser is started at step S502. At step S504, the method determines if a hash table is saved in local storage. If a hash table is saved locally, reading the hash table, and initializing the hash table at step S506. If no hash table is saved locally, a hash table is created at step S508.

At step S510, a web page request is received from a user to load a webpage. The method comprises acquiring a host domain name of the requested website, determining whether the hash table has a domain name tree corresponding to the host domain name at step S512. If no corresponding domain name tree is identified in the hash table, a domain name tree is established at step S514. TCP connection is established for host domain name at step S516. If a corresponding domain name tree is identified in the hash table, the domain name tree is inspected to acquire subresource domain names in top 5 priorities at step S518. When the number of the subresource domain names is less than 5, all the subresource domain names are obtained. At step S520, TCP connections are established for both the subresource domain names and the host domain name.

Main resource is received at step S522. The browser kernel analyzes the original data to obtain the subresource URL and generates a subresource loading request at step S524.

The network adaptation layer receives the subresource loading request generated by the browser kernel, inspect the domain name tree to determine whether the subresource domain name specified in the subresource loading request is corresponding to one subresource domain name listed in the domain name tree at step S526. If a corresponding subresource domain name is not identified from the domain name tree, node of a domain name tree for storing the subresource domain names is established at step S528. The priority is set according to the type of the subresource. If the subresource is JS/CSS at step S530, the priority is set to 5 at step S532. Otherwise, the priority is set to 1 at step S534.

If a corresponding subresource domain name is determined to be in the domain name tree at step S526 and subresource is determined to be JS/CSS at step S536, priority is increased by 5 at step S538. Otherwise, priority is increased by 1 at step S540.

Then it is determined whether the TCP connection of a subresource domain name specified in the subresource loading request has been established at step S542. If the TCP connection has not established, a request is generated after a TCP connection is established at step S544. Otherwise, a request is generated using the established connection at step S546. The subresource is then loaded to the web page at step S548. Webpage loading is completed at step S550. When user determines to exit the browser, the hash table data is saved locally for future use at step S552.

Figure 6:
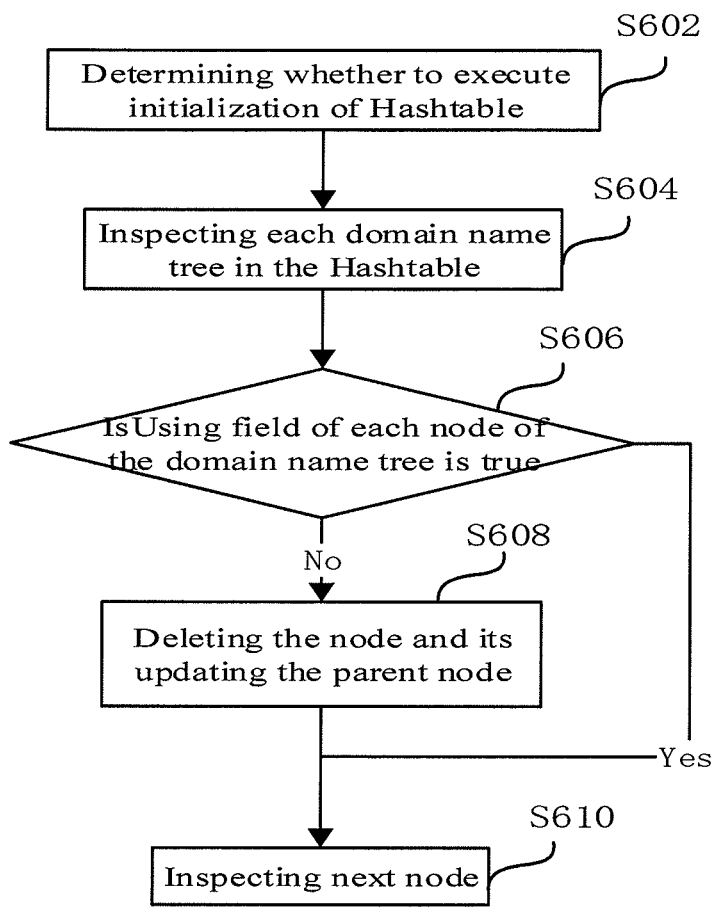
FIG. 6 is a flow chart illustrating initialization process of hash table in accordance with an embodiment of the present invention.

When a browser is started, if a hash table has been established locally, the hash table needs to be initialized. The process of initializing the hash table is shown in FIG. 6.

At step S602, the method comprises reading a file to determine whether to execute initialization of hash table. Each domain name tree in the hash table is inspected at step S604. At step S606, the method determines if the IsUsing field of each node of the domain name tree is true. If the IsUsing field of each node is false, the domain name corresponding to the node has never been used (or the domain name expired). The node is then deleted and its parent node is updated at step S608. Then the method proceeds to inspect next node at step S610. If the result at step S606 is true, the method proceeds to inspect next node at step S610.

Figure 7:
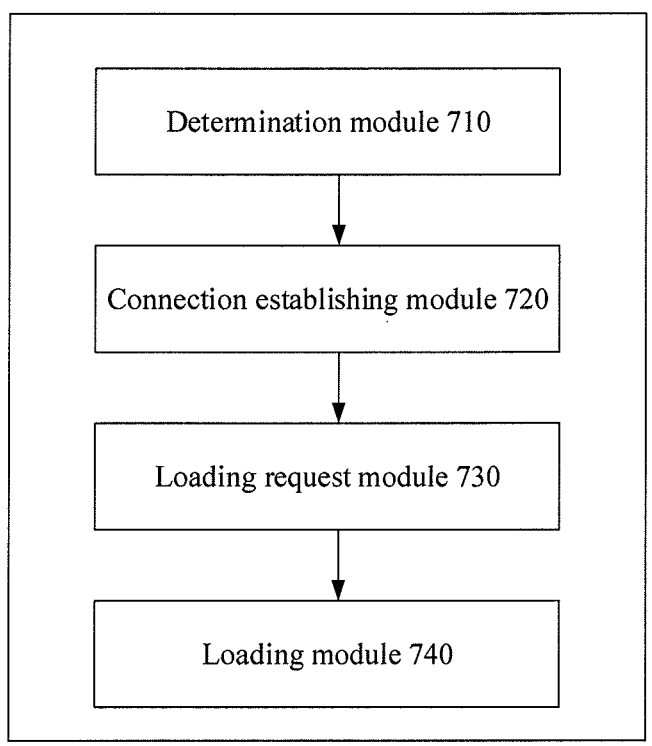
FIG. 7 is a block diagram of an apparatus for increasing the subresource loading speed in accordance with an embodiment.

An apparatus 700 for increasing the subresource loading speed is illustrated in FIG. 7. The apparatus 700 comprises a determination module 710 configured to receive a web page request from a user, acquire the host domain name corresponding to the web page URL, and determine whether a domain name tree corresponding to the host domain name is in the hash table.

The apparatus 700 further comprises a connection establishing module 720. If a domain name tree corresponding to the host domain name is determined to be in the hash table, the connection establishing module 720 is configured to inspect the domain name tree, acquire a plurality of subresource domain names with the highest priority, and establish TCP connections for both the host domain name and the plurality of subresource domain names.

The apparatus 700 further comprises a loading request module 730. Upon receipt of main resource of the host domain name, the loading request module 730 is configured to parse the main resource data and generate a subresource loading request according to the subresource URL in the main resource.

The apparatus 700 further comprises a loading module 740. If the subresource domain name specified in the subresource loading request is determined to be corresponding to one subresource domain name listed in the subresource domain names, the loading module 740 is configured to generate a HTTP request using the established TCP connection. The subresource is then loaded to the web page.

In addition, the apparatus 700 may further comprise a starting module (not shown) configured to determine if a hash table has been created locally after the browser is started. If yes, the starting module is configured to read the hash table and initialize the hash table. If a hash table is not created locally, a new hash table is created.

Furthermore, the starting module may further comprise an initialization unit (not shown). When the hash table is initialized, the initialization unit is configured to inspect each domain name tree in the hash table and determine whether the use field of each node of the domain name tree is true. If it is determined to be false, the initialization unit is configured to delete the node and update its parent node. The initialization unit is configured to inspect next node. If it is determined to be true, the initialization unit is configured to inspect next node.

In an exemplary embodiment of the present invention, the determination module 710 may further comprise a domain name tree creation unit (not shown). If no domain name tree corresponding to the host domain name is found in the hash table, the domain name tree creation unit is configured to create a domain name tree.

In another exemplary embodiment, the apparatus 700 may further comprise a node management module (not shown). When a subresource loading request is generated, the node management module is configured to identify the domain name tree corresponding to the host domain name in the subresource URL. If the subresource domain name specified in the subresource loading request is not in the domain name tree, the node management module is configured to create a domain name tree node in the domain name tree to save the subresource domain name, and set the priority of the subresource domain name according to the subresource type. If the subresource domain name specified in the subresource loading request is in the domain name tree, the node management module is configured to update the priority of the subresource domain name.

Comparing with the prior art, by establishing TCP connections for subresource domain names with higher priority in advance, the technical solution of the present invention solves the problem that TCP connection is established after a subresource loading request is generated by a kernel. By saving a hash table of a host domain name and its subresource domain name tree, exemplary embodiments of the present invention can establish connections for subresource domain names while establishing TCP connections for host domain name. As a result, when a subresource loading request is generated by a kernel there is no need to establish TCP connections, which significantly saves the time in response to subresources loading request, thereby increasing the loading speed of the entire web page and improving user experience.

Those skilled in the art should understand that the implementation of all or some steps of the method in the above embodiments may be achieved by programming hardware, the program may be stored in a computer readable storage medium. When the program is executed, the above steps of the method in the embodiments are executed. The storage medium may be ROM/RAM, disks, CDs, memory cards, etc.

Many modifications and other example embodiments set forth herein will come to mind to one skilled in the art to which these example embodiments pertain having the benefit of the teachings presented in the foregoing descriptions and the associated drawings. Therefore, it is to be understood that the embodiments are not to be limited to the specific ones disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions other than those explicitly described above are also contemplated as may be set forth in some of the appended claims. Although specific terms are employed herein, they are used in a generic and descriptive sense only and not for purposes of limitation.

That which is claimed:

1. A method for increasing subresource loading speed, the method comprising:

receiving a page request initiated by a user;

extracting a host domain name corresponding to a page URL (Uniform Resource Locator);

querying if a hash table has a domain name tree corresponding to the host domain name;

in an instance when the hash table has the domain name tree corresponding to the host domain name, traversing the domain name tree corresponding to the host domain name and extracting a plurality of subresource domain names with a highest priority, and at a same time, establishing TCP (Transmission Control Protocol) connections for the host domain name and the plurality of subresource domain names;

when a main document data of the host domain name is received, resolving the main document data and initiating a subresource loading request according to a subresource URL in the main document data;

in an instance when the subresource domain name in the subresource loading request is a domain name in the plurality of subresource domain names, directly initiating a HTTP (Hypertext Transfer Protocol) request by using the established TCP connections of the plurality of subresource domain names, and completing the loading of the subresource and wherein, after the subresource loading request is initiated, the method further comprises:

querying the domain name tree corresponding to the host domain name, in an instance when the domain name tree corresponding to the host domain name does not contain the subresource domain name in the subresource loading request, creating a node in the domain name tree corresponding to the host domain name to store the subresource domain name, and initializing the priority of the subresource domain name according to a resource type of the subresource; and in an instance when the domain name tree corresponding to the host domain name contains the subresource domain name in the subresource loading request, updating the priority of the subresource domain name according to the resource type of the subresource.

2. The method according to claim 1, further comprising, when a browser is started, determining if a hash table is stored locally, if yes, reading the hash table, and initializing the hash table; if no, creating an empty hash table.

3. The method according to claim 2, wherein the initializing the hash table comprises:

traversing each domain name tree in the hash table, determining if the use marker field of each node of the domain name tree is true, if not true, deleting the node and updating the parent node of the node, and traversing the next node; if the use marker field of the node is true, traversing the next node.

4. The method according to claim 1, further comprising, when the hash table is queried, if no domain name tree corresponding to the host domain name is found, creating an empty domain name tree.

5. A method for increasing subresource loading speed, the method comprising:
   extracting a host domain name in a page request;
   querying if a domain name tree corresponding to the host domain name exists;
   in an instance when a domain name tree corresponding to the host domain name exists, extracting a predetermined amount of subresource domain names from the domain name tree, and establishing TCP (Transmission Control Protocol) connections for the host domain name and the predetermined amount of subresource domain names;
   initiating a subresource loading request according to a subresource domain name in an obtained main document data corresponding to the host domain name; and
   in an instance when a subresource domain name with TCP connection established contains the subresource domain name in the subresource loading request, initiating a HTTP (Hypertext Transfer Protocol) request by using the established TCP connection corresponding to the subresource domain names, and loading the subresource and wherein, after the subresource loading request is initiated, the method further comprises:
   querying the domain name tree corresponding to the host domain name, in an instance when the domain name tree corresponding to the host domain name does not contain the subresource domain name in the subresource loading request, creating a node in the domain name tree corresponding to the host domain name to store the subresource domain name, and initializing the priority of the subresource domain name according to a resource type of the subresource; and
   in an instance when the domain name tree corresponding to the host domain name contains the subresource domain name in the subresource loading request, updating the priority of the subresource domain name according to the resource type of the subresource.

6. The method according to claim 5, wherein the querying if a domain name tree corresponding to the host domain name exists comprises:
   determining if a domain name tree corresponding to the host domain name is stored in the hash table that stores the corresponding relation between host domain names and domain name trees.

7. The method according to claim 6, further comprising, when a browser is started, determining if a hash table is stored locally, if yes, reading the hash table, and initializing the hash table; if no, creating an empty hash table.

8. The method according to claim 6, further comprising, when the hash table is queried, if no domain name tree corresponding to the host domain name is found, creating an empty domain name tree.

9. The method according to claim 5, wherein the extracting a predetermined amount of subresource domain names from the domain name tree comprises:
extracting a predetermined amount of subresource domain names according to the priority sequence, from high to low, of subresource domain names from the domain name tree.

10. An apparatus for increasing subresource loading speed, wherein the apparatus comprises:
   a processor;
   a memory;
   a query module stored in the memory and executed by the processor, configured to receive a page request initiated by a user, extract a host domain name corresponding to a page URL (Uniform Resource Locator), and query if a hash table has a domain name tree corresponding to the host domain name;
   a connection establishing module stored in the memory and executed by the processor, configured to, in an instance when the hash table has the domain name tree corresponding to the host domain name, traverse the domain name tree corresponding to the host domain name and extract a plurality of subresource domain names with a highest priority, and at a same time, establish TCP (Transmission Control Protocol) connections for the host domain name and the plurality of subresource domain names;
   a loading request module stored in the memory and executed by the processor, configured to, when a main document data of the host domain name is received, resolve the main document data, and initiate a subresource loading request according to a subresource URL in the main document data;
   a loading module stored in the memory and executed by the processor, configured to, in an instance when the subresource domain name in the subresource loading request is a domain name in the plurality of subresource domain names, directly initiate a HTTP (Hypertext Transfer Protocol) request by using the established TCP connections of the plurality of subresource domain names, and complete the loading of the subresource and wherein, after the subresource loading request is initiated, the apparatus is further configured to: query the domain name tree corresponding to the host domain name, in an instance when the domain name tree corresponding to the host domain name does not contain the subresource domain name in the subresource loading request, create a node in the domain name tree corresponding to the host domain name to store the subresource domain name, and initialize the priority of the subresource domain name according to a resource type of the subresource; and
   in an instance when the domain name tree corresponding to the host domain name contains the subresource domain name in the subresource loading request, update the priority of the subresource domain name according to the resource type of the subresource.

11. The apparatus according to claim 10, wherein the apparatus further comprises:
   a starting module stored in the memory and executed by the processor, configured to, when a browser is started, determine if a hash table is stored locally, if yes, read the hash table, and initialize the hash table; if no, create an empty hash table.

12. The apparatus according to claim 10, wherein the apparatus further comprises:
   a domain name tree creation module stored in the memory and executed by the processor, configured to, when the hash table is queried, if no domain name tree corresponding to the host domain name is found, create an empty domain name tree.

13. The apparatus according to claim 10, wherein the apparatus further comprises:
an initialization module stored in the memory and executed by the processor, configured to, when the hash table is initialized, traverse each domain name tree in the hash table, determine if the use marker field of each node of the domain name tree is true, if not true, delete the node and updating the parent node of the node and traverse the next node, and if the use marker field of the node is true, traverse the next node.

14. An apparatus for increasing the subresource loading speed, the apparatus comprising:
a processor;
a memory;
a query module stored in the memory and executed by the processor, configured to extract a host domain name in the page request, and query if a domain name tree corresponding to the host domain name exists;
a connection establishing module stored in the memory and executed by the processor, configured to, in an instance when a domain name tree corresponding to the host domain name exists, extract a predetermined amount of subresource domain names from the domain name tree, and establish TCP (Transmission Control Protocol) connections for the host domain name and the predetermined amount of subresource domain names;
a loading request module stored in the memory and executed by the processor, configured to initiate a subresource loading request according to a subresource domain name in an obtained main document data corresponding to the host domain name; and
a loading module stored in the memory and executed by the processor, configured to, in an instance when a subresource domain name with TCP connection established contains the subresource domain name in the subresource loading request, initiate a HTTP (Hypertext Transfer Protocol) request by using the established TCP connection corresponding to the subresource domain names, and loading the subresource and wherein, after the subresource loading request is initiated, the apparatus is further configured to:
query the domain name tree corresponding to the host domain name, in an instance when the domain name tree corresponding to the host domain name does not contain the subresource domain name in the subresource loading request, create a node in the domain name tree corresponding to the host domain name to store the subresource domain name, and initialize the priority of the subresource domain name according to a resource type of the subresource; and
in an instance when the domain name tree corresponding to the host domain name contains the subresource domain name in the subresource loading request, update the priority of the subresource domain name according to the resource type of the subresource.

15. The apparatus according to claim 14, wherein the query module is further configured to determine if a domain name tree corresponding to the host domain name is stored in the hash table that stores the corresponding relation between host domain names and domain name trees.

16. The apparatus according to claim 15, wherein the apparatus further comprises:

a starting module stored in the memory and executed by the processor, configured to, when a browser is started, determine if a hash table is stored locally, if yes, read the hash table, and initialize the hash table; if no, create an empty hash table.

17. The apparatus according to claim 15, wherein the apparatus further comprises:
a domain name tree creation module stored in the memory and executed by the processor, configured to, when the hash table is queried, if no domain name tree corresponding to the host domain name is found, create an empty domain name tree.

18. The apparatus according to claim 15, wherein the apparatus further comprises:
an initialization module stored in the memory and executed by the processor, configured to, when the hash table is initialized, traverse each domain name tree in the hash table, determine if the use marker field of each node of the domain name tree is true, if not true, delete the node and updating the parent node of the node and traverse the next node, and if the use marker field of the node is true, traverse the next node.

19. The apparatus according to claim 14, wherein the connection establishing module is further configured to extract a predetermined amount of subresource domain names according to the priority sequence, from high to low, of subresource domain names from the domain name tree.

20. A non-transitory computer readable medium having program codes executable by the processor, wherein the program codes cause the processor to execute the following:
extracting a host domain name in the page request, querying if a domain name tree corresponding to the host domain name exists;
in an instance when a domain name tree corresponding to the host domain name exists, extracting a predetermined amount of subresource domain names from the domain name tree, and establishing TCP (Transmission Control Protocol) connections for the host domain name and the predetermined amount of subresource domain names;
initiating a subresource loading request according to a subresource domain name in an obtained main document data corresponding to the host domain name; and
in an instance when a subresource domain name with TCP connection established contains the subresource domain name in the subresource loading request, initiating a HTTP (Hypertext Transfer Protocol) request by using the established TCP connection corresponding to the subresource domain names, and loading the subresource and wherein, after the subresource loading request is initiated, the program codes further cause the processor to: query the domain name tree corresponding to the host domain name, in an instance when the domain name tree corresponding to the host domain name does not contain the subresource domain name in the subresource loading request, create a node in the domain name tree corresponding to the host domain name to store the subresource domain name, and initialize the priority of the subresource domain name according to a resource type of the subresource; and
in an instance when the domain name tree corresponding to the host domain name contains the subresource domain name in the subresource loading request, update the priority of the subresource domain name according to the resource type of the subresource.

* * * * *